United States Patent
Ikeda

(10) Patent No.: US 12,485,771 B2
(45) Date of Patent: Dec. 2, 2025

(54) OUTPUT CONTROL SYSTEM

(71) Applicant: ISUZU MOTORS LIMITED, Tokyo (JP)

(72) Inventor: Yuta Ikeda, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 158 days.

(21) Appl. No.: 18/547,769

(22) PCT Filed: Mar. 1, 2022

(86) PCT No.: PCT/JP2022/008478
§ 371 (c)(1),
(2) Date: Aug. 24, 2023

(87) PCT Pub. No.: WO2022/186168
PCT Pub. Date: Sep. 9, 2022

(65) Prior Publication Data
US 2024/0300337 A1    Sep. 12, 2024

(30) Foreign Application Priority Data
Mar. 1, 2021 (JP) .................................. 2021-032000

(51) Int. Cl.
*B60L 15/00* (2006.01)
*B60L 15/20* (2006.01)
*B60L 3/00* (2019.01)

(52) U.S. Cl.
CPC ........... *B60L 15/20* (2013.01); *B60L 2250/28* (2013.01)

(58) Field of Classification Search
CPC ...... B60L 15/00; B60L 15/20; B60L 2250/28; B60L 3/00
See application file for complete search history.

(56) References Cited

U.S. PATENT DOCUMENTS 5,476,078 A * 12/1995 Pfalzgraf .............. F02D 11/107
                                                                    123/399
5,731,669 A    3/1998 Shimizu
(Continued)

FOREIGN PATENT DOCUMENTS

CA         233725 A     8/1923
CN      101044037 A     9/2007
(Continued)

OTHER PUBLICATIONS

International Search Report from International Application No. PCT/JP2022/008478 mailed Apr. 12, 2022.

*Primary Examiner* — Tan Q Nguyen
(74) *Attorney, Agent, or Firm* — Shih IP Law Group, PLLC

(57) ABSTRACT

An output control system includes: an accelerator pedal; a motor, for driving a vehicle, that increases the output as a depression amount of the accelerator pedal increases; a detent mechanism that increases resistance acting on the accelerator pedal at a position where the depression amount of the accelerator pedal reaches a predetermined depression amount that is smaller than a maximum depression amount of the accelerator pedal; a depression amount acquiring part that acquires the depression amount of the accelerator pedal; and a motor control part that controls the output of the motor such that the output of the motor becomes a predetermined power that is smaller than a maximum power of the motor when the depression amount acquired by the depression amount acquiring part is the predetermined depression amount.

7 Claims, 4 Drawing Sheets

(56) References Cited

U.S. PATENT DOCUMENTS

| | | | | |
|---|---|---|---|---|
| 6,029,513 | A | * | 2/2000 | Kikori ................... F02D 11/105 |
| | | | | 123/337 |
| 10,145,311 | B1 | * | 12/2018 | Reynolds .............. F02D 41/221 |
| 2002/0138183 | A1 | | 9/2002 | Keilhofer et al. |
| 2007/0000345 | A1 | * | 1/2007 | Leone ...................... G05G 1/38 |
| | | | | 74/513 |
| 2008/0045377 | A1 | | 2/2008 | Kaya |
| 2020/0047762 | A1 | * | 2/2020 | Miyake ............... B60W 10/184 |

FOREIGN PATENT DOCUMENTS

| | | | |
|---|---|---|---|
| CN | 106314147 | A | 1/2017 |
| CN | 109955728 | A | 7/2019 |
| JP | H09-084208 | A | 3/1997 |
| JP | 2004-166423 | A | 6/2004 |
| JP | 2014-027822 | A | 2/2014 |
| JP | 2016-196221 | A | 11/2016 |
| KR | 19980054904 | U | 10/1998 |

\* cited by examiner

OUTPUT CONTROL SYSTEM

CROSS-REFERENCE TO RELATED APPLICATIONS

The present application is a U.S. National Stage entry of PCT Application number PCT/JP2022/008478, filed on Mar. 1, 2022, which claims priority under 35 U.S.C § 119 (a) to Japanese Patent Application No. 2021-032000, filed on Mar. 1, 2021, contents of which are incorporated herein by reference in their entirety.

TECHNICAL FIELD

The present disclosure relates to an output control system for controlling the output of a motor in a vehicle.

BACKGROUND OF THE INVENTION

A technique for controlling the output of a motor is known. Patent Document 1 discloses a technique of operating a motor at maximum power when an accelerator pedal is depressed to the maximum.

PRIOR ART

Patent Document

Japanese Unexamined Patent Application Publication No. 9-84208

BRIEF DESCRIPTION OF THE INVENTION

Problem to be Solved by the Invention

However, continuing to operate a motor at maximum power may cause the motor to fail due to heat generated therein, thus the output of the motor may be limited in order to cool the heated motor.

The present disclosure has been made in view of these points, and its object is to control the output of a motor appropriately.

Means for Solving the Problem

An aspect of the present disclosure provides an output control system including: an accelerator pedal; a motor for driving a vehicle by increasing an output as a depression amount of the accelerator pedal increases; a resistance applying mechanism that increases resistance acting on the accelerator pedal at a position where the depression amount of the accelerator pedal reaches a predetermined depression amount that is smaller than a maximum depression amount of the accelerator pedal; a depression amount acquiring part that acquires the depression amount of the accelerator pedal; and a motor control part that controls the output of the motor such that the output of the motor becomes a predetermined power that is smaller than a maximum power of the motor when the depression amount acquired by the depression amount acquiring part is the predetermined depression amount.

The output control system may further include an output setting part that sets the predetermined power to a rated power of the motor that is smaller than the maximum power, wherein the motor control part may control the output of the motor such that the output of the motor becomes the rated power set as the predetermined power by the output setting part when the depression amount is the predetermined depression amount.

The output control system may further include: a total weight acquiring part that acquires total weight information indicating a total weight of the vehicle; and an output setting part that sets the predetermined power to a smaller value as the total weight indicated by the total weight information is smaller, wherein the motor control part may control the output of the motor such that the output of the motor becomes the predetermined power set by the output setting part when the depression amount is the predetermined depression amount.

The output control system may further include: a total weight acquiring part that acquires total weight information indicating a total weight of the vehicle; a setting reception part that receives a setting of a first mode for setting the predetermined power to a rated power of the motor that is smaller than the maximum power, or a second mode for setting the predetermined power to a smaller value as the total weight indicated by the total weight information is smaller; and an output setting part that sets the predetermined power to the rated power if the setting of the first mode is received, and sets the predetermined power to a smaller value as the total weight is smaller if the setting of the second mode is received, wherein the motor control part may control the output of the motor such that the output of the motor becomes the predetermined power set by the output setting part when the depression amount is the predetermined depression amount.

The output control system may further include an output device that outputs information indicating an abnormal state in which the motor 1 cannot output the predetermined power when the depression amount acquired by the depression amount acquiring part is the predetermined depression amount, if it is determined that the abnormal state has occurred.

Effect of the Invention

According to the present disclosure, it is possible to control the output of the motor appropriately.

DESCRIPTION OF EMBODIMENTS

[Configuration of the Output Control System S]

Figure 1:
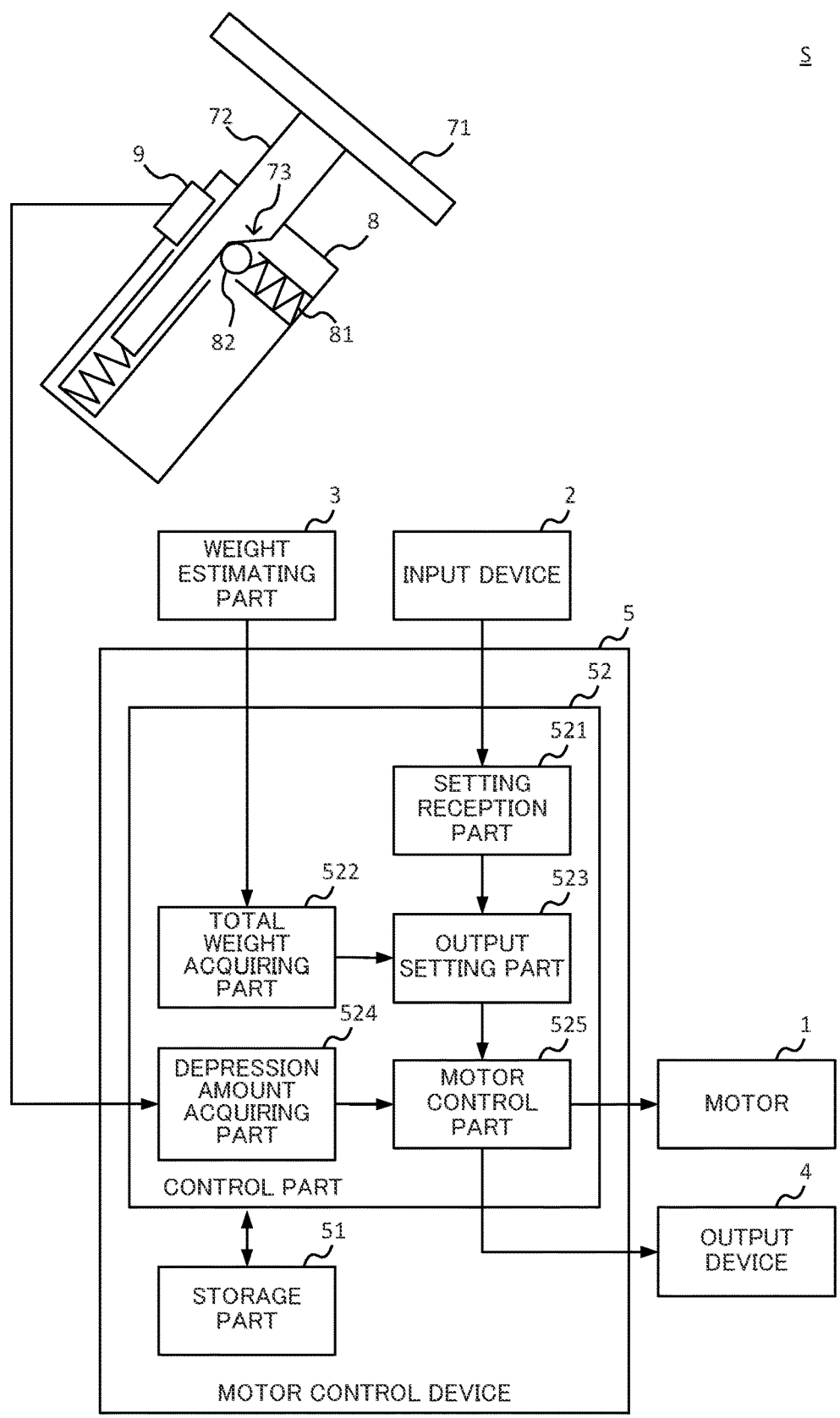
FIG. 1 schematically shows a configuration of an output control system.

FIG. 1 schematically shows a configuration of an output control system S. The output control system S controls the output of a motor 1 for driving a vehicle. The output control system S is mounted in the vehicle such as a truck or a trailer. The output control system S includes a motor 1, an input device 2, a weight estimating part 3, an output device 4, a motor control device 5, an accelerator pedal 71, a detent mechanism 8, and a depression amount sensor 9.

The motor 1 is a motor for driving the vehicle. The motor 1 is connected to a propeller shaft (not shown). The motor 1 rotates the propeller shaft, thereby rotating an axle shaft connected to the propeller shaft and a tire connected to this axle shaft. The motor 1 is controlled by the motor control device such that the output increases as a depression amount of the accelerator pedal 71 increases. It should be noted that the motor 1 may be directly connected to the axle shaft without the propeller shaft. Further, the motor 1 may be directly connected to the tire. The motor 1 may be an in-wheel motor built in the tire.

The detent mechanism 8 is connected to the accelerator pedal 71. The detent mechanism 8 is a resistance applying mechanism that applies resistance to the accelerator pedal 71. Specifically, the detent mechanism 8 increases resistance acting on the accelerator pedal 71 at a position where a depression amount of the accelerator pedal 71 reaches a predetermined depression amount that is smaller than a maximum depression amount of the accelerator pedal 71. The following describes how the detent mechanism 8 increases resistance acting on the accelerator pedal 71.

The detent mechanism 8 applies resistance to the accelerator pedal 71 by a spring 81 and a pin 82 connected to the spring 81. A shaft 72 connected to the accelerator pedal 71 is provided with a step 73. The step 73 is provided at a position where a depression amount of the accelerator pedal 71 reaches the predetermined depression amount. When the accelerator pedal 71 is depressed to a predetermined position, the pin 82 and the spring 81 are pressed down by the step 73, causing the spring 81 to shrink and increase its resilience. Thus, resistance acting on the accelerator pedal 71 increases. In this way, the detent mechanism 8 can increase resistance acting on the accelerator pedal 71 at a position where the depression amount reaches the predetermined depression amount.

It should be noted that the predetermined depression amount may be appropriately determined in consideration of a driver's operation feeling. A specific value of the predetermined depression amount is set to 80 when the maximum depression amount is set to 100, for example. Further, the resistance applying mechanism is not limited to the detent mechanism 8, and other mechanisms capable of increasing resistance at a position where a depression amount of the accelerator pedal 71 reaches the predetermined depression amount may be used.

By increasing resistance acting on the accelerator pedal 71 at a position where the depression amount reaches the predetermined depression amount, it is possible to increase the resistance that a driver driving the vehicle feels from the accelerator pedal 71 when the driver depresses the accelerator pedal 71 to a position where the depression amount reaches the predetermined depression amount. Therefore, increasing a depressing force is necessary in order to further depress the accelerator pedal 71 from the position where the depression amount reaches the predetermined depression amount, so that it becomes difficult for the driver to depress the accelerator pedal 71 from the position where the depression amount reaches the predetermined depression amount. As a result, a depression amount of the accelerator pedal 71 can be easily maintained at the predetermined depression amount. Further, the driver can understand that he/she depressed the accelerator pedal 71 to the position where a depression amount of the accelerator pedal 71 reaches the predetermined depression amount.

The depression amount sensor 9 detects a depression amount of the accelerator pedal 71. For example, the depression amount sensor 9 detects the depression amount by detecting a position of a magnet provided to the shaft 72. It should be noted that the depression amount sensor 9 is not limited to this, and may be any sensor capable of detecting a depression amount.

The input device 2 receives input of various types of information. For example, the driver driving the vehicle can input various types of information by operating the input device 2. The input device 2 is, for example, a touch panel, a switch, or a button, but is not limited thereto.

The weight estimating part 3 is a calculation resource for estimating weight. The weight estimating part 3 estimates a weight of goods loaded on a cargo bed, for example, on the basis of a relationship between the driving force and acceleration of the vehicle. Instead of the weight estimating part 3, a weight sensor may be provided to the cargo bed on which goods are to be loaded. In this case, the weight sensor detects the weight of the goods loaded on the cargo bed.

The output device 4 is a notification device for notifying about various types of information. For example, the output device 4 can notify about various types of information by turning on a lamp corresponding to the various types of information. Further, the output device 4 may be a display device that displays information as an image to notify about the information.

The motor control device 5 controls the output of the motor 1 such that the output of the motor becomes a predetermined power when a depression amount of the accelerator pedal 71 is the predetermined depression amount. Hereinafter, a configuration of the motor control device 5 will be specifically described. The motor control device 5 includes a storage part 51 and a control part 52.

The storage part 51 includes a storage medium such as a Read Only Memory (ROM), a Random Access Memory (RAM), and a hard disk. The storage part 51 stores a program executed by the control part 52. Further, the storage part 51 stores the rated power of the motor 1. The rated power is smaller than the maximum power of the motor 1, and is determined by the design and performance of the motor 1. Further, the rated power is a value representing the output power of the motor when the motor 1 can continue to output power without restricting its power due to the heat generation within the motor 1.

The control part 52 is a calculation resource including a processor such as a Central Processing Unit (CPU). The control part 52 executes a program stored in the storage part 51 to function as a setting reception part 521, a total weight acquiring part 522, an output setting part 523, a depression amount acquiring part 524, and a motor control part 525.

The setting reception part 521 receives a mode-setting instruction for setting a predetermined power of the motor 1. For example, the setting reception part 521 receives a mode-setting instruction input to the input device 2. Specifically, the setting reception part 521 receives a setting instruction of a first mode in which the predetermined power is set to the rated power of the motor 1, or a second mode in which the predetermined power is set to a smaller value as a total weight of the vehicle is smaller.

The total weight acquiring part 522 acquires total weight information indicating a total weight of the vehicle. Specifically, the total weight acquiring part 522 acquires a value obtained by adding a weight estimated by the weight estimating part 3 and a weight of the subject vehicle stored in advance, as the total weight of the vehicle. Further, the total weight acquiring part 522 may acquire total weight information indicating a total weight of the vehicle input to the input device 2. It should be noted that a total weight of the vehicle in an unloaded state in which the vehicle is not loaded with goods is the minimum total weight. Further, a total weight of the vehicle in a state in which goods are loaded up to the vehicle's maximum carried load is the maximum total weight.

The output setting part 523 sets a predetermined power at the time when a depression amount of the accelerator pedal 71 is the predetermined depression amount. Hereinafter, the predetermined power at the time when a depression amount is the predetermined depression amount is referred to as a "set-power". For example, the output setting part 523 refers to the storage part 51 to set the set-power to the rated power of the motor 1.

When the setting reception part 521 receives a setting instruction, the output setting part 523 sets the set-power according to the received setting instruction. For example, if the setting reception part 521 receives a setting instruction of the first mode, the output setting part 523 sets the set-power to the rated power.

If the setting reception part 521 receives a setting instruction of the second mode, the output setting part 523 sets the set-power to a smaller value as a total weight is smaller. Further, the output setting part 523 may set the set-power to a larger value as a total weight is larger. Specifically, the output setting part 523 refers to relationship information indicating a relationship between a total weight and a value to be set as the output of the motor 1, and sets the set-power to a value corresponding to the total weight. The relationship information is stored in advance in the storage part 51.

Figure 2:
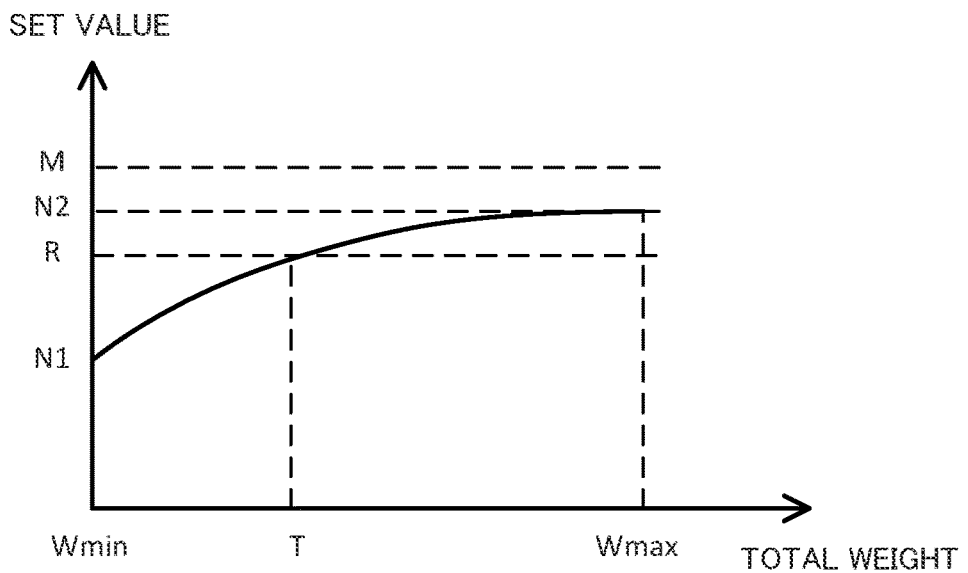
FIG. 2 shows a relationship between a total weight and a value that is set as the output of a motor 1.

FIG. 2 shows a relationship between a total weight and a set value of the output of the motor 1. The horizontal axis of FIG. 2 represents the total weight. The vertical axis represents the set value of the output of the motor 1. As shown in FIG. 2, a value set with respect to the total weight is smaller the smaller the total weight is.

When a total weight of the vehicle is a weight T, which is larger than a minimum total weight Wmin and smaller than a maximum total weight Wmax, the output setting part 523 sets the set-power to a rated power R. When the total weight of the vehicle is the minimum total weight Wmin, the output setting part 523 sets the set-power to a value N1 that is smaller than the rated power. Further, when the total weight of the vehicle is the maximum total weight Wmax, the output setting part 523 sets the set-power to a value N2 that is larger than the rated power R.

The depression amount acquiring part 524 acquires a depression amount of the accelerator pedal 71. Specifically, the depression amount acquiring part 524 acquires the depression amount detected by the depression amount sensor 9.

The motor control part 525 controls the output of the motor 1 such that the output increases as a depression amount of the accelerator pedal 71 increases. For example, the motor control part 525 controls the output of the motor 1 such that the output of the motor becomes the set-power when a depression amount is the predetermined depression amount. Since the detent mechanism 8 makes it harder for a driver to depress the accelerator pedal 71 from a position where the depression amount reaches the predetermined depression amount, the motor control part 525 can prevent the motor 1 from outputting the maximum power, and can operate the motor 1 at the set-power that is smaller than the maximum power. As a result, the motor control part 525 can prevent the motor 1 from heating up, making it possible to prevent the output of the motor 1 from being limited.

If the output setting part 523 sets the set-power to the rated power, the motor control part 525 controls the output of the motor 1 such that the output of the motor becomes the rated power when a depression amount is the predetermined depression amount. Since a depression amount can be easily maintained at the predetermined depression amount due to the detent mechanism 8, the motor control part 525 can cause the motor 1 to maintain its output at the rated power. Since the motor 1 operating at the rated power prevents the heat generation within the motor 1, it is possible to prevent the output of the motor 1 from being limited due to the heated motor 1. In this way, the motor control part 525 can appropriately control the output of the motor 1 so that the motor 1 can operate at the maximum power when the motor needs to operate at the maximum power.

Figure 3:
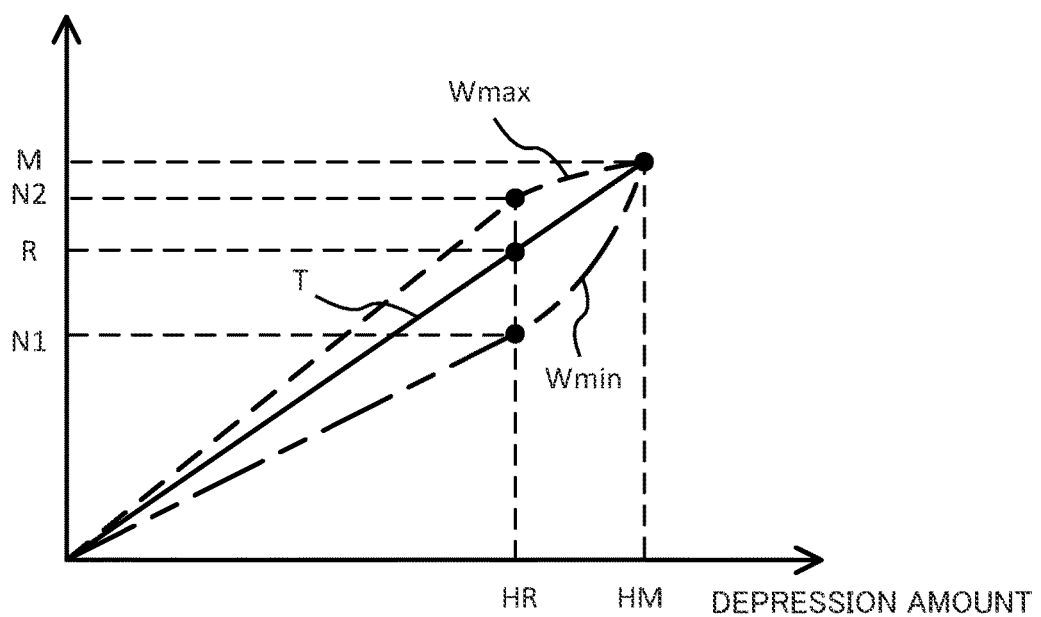
FIG. 3 schematically shows a relationship between a depression amount and an output.

If the set-power is set to a value corresponding to a total weight, the motor control part 525 controls the output of the motor 1 such that the amount of the output of the motor 1 becomes a value that is set in accordance with the total weight. For example, the motor control part 525 increases the output for the same depression amount as the total weight increases. FIG. 3 schematically shows a relationship between a depression amount and an output. The horizontal axis of FIG. 3 represents a depression amount of the accelerator pedal 71. The vertical axis represents the output of the motor 1.

If a total weight of the vehicle is a weight T, the motor control part 525 controls the output of the motor 1 such that the motor outputs the rated power R when a depression amount is a predetermined depression amount HR. If a total weight of the vehicle is a minimum total weight Wmin, the motor control part 525 controls the output of the motor 1 such that the amount of the output of the motor becomes the value N1 when a depression amount is the predetermined depression amount HR. If a total weight of the vehicle is a maximum total weight Wmax, the motor control part 525 controls the output of the motor 1 such that the amount of the output of the motor becomes the value N2 when a depression amount is the predetermined depression amount HR. In any of these cases, the motor control part 525 controls the output of the motor 1 such that the motor outputs the maximum power M when a depression amount is a maximum depression amount HM.

As described above, the motor control part 525 can control the motor 1 so that its output does not unnecessarily increase when the vehicle is not loaded with goods and a total weight of the vehicle is small. Further, the motor control part 525 can control the output of the motor 1 so that the motor 1 produces output necessary for driving the vehicle when the vehicle is loaded with goods, and a total weight of the vehicle is large. In this way, the motor control part 525 can appropriately control the output of the motor 1 in accordance with a total weight of the vehicle.

Figure 4:
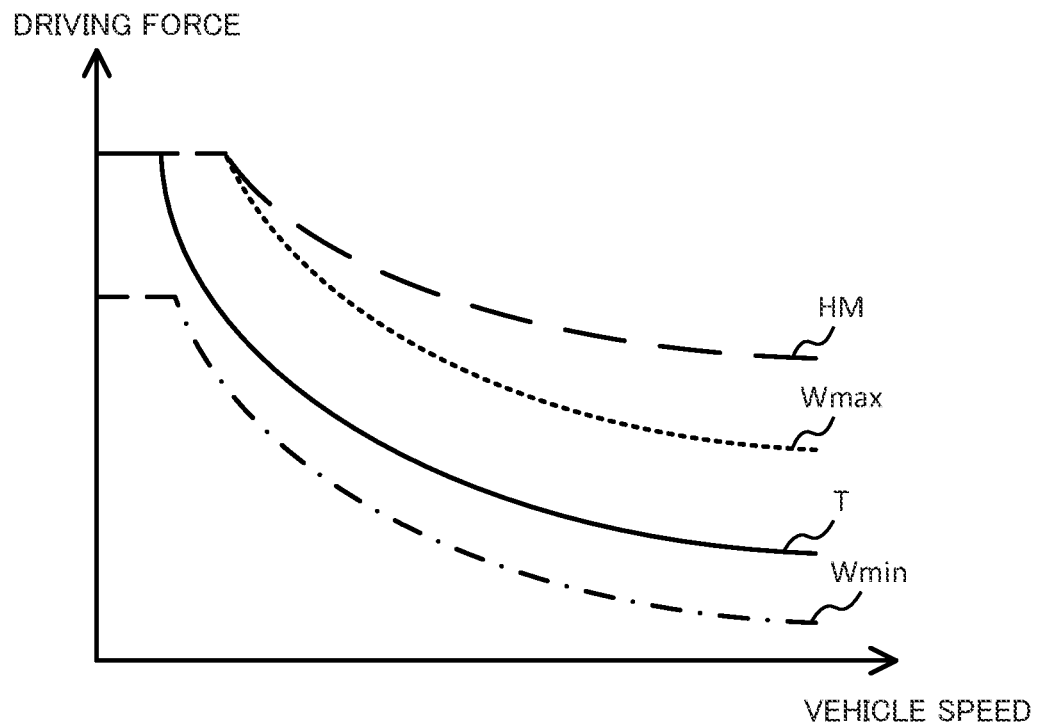
FIG. 4 is a graph showing a relationship between a vehicle speed and a driving force when a depression amount is constant.

FIG. 4 is a graph showing a relationship between a vehicle speed and a driving force at the time when a depression amount is constant. The horizontal axis of FIG. 4 represents a vehicle speed of the vehicle. The vertical axis represents a driving force of the vehicle. As shown in FIG. 4, when a depression amount is constant, that is, when the output of the motor 1 is constant, the driving force of the vehicle decreases as the vehicle speed increases.

A relationship between the vehicle speed and the driving force in a case where a depression amount is constant at the predetermined depression amount HR and a total weight of the vehicle is a weight T is represented by a solid line. A relationship between the vehicle speed and the driving force in a case where a depression amount is constant at the predetermined depression amount HR and a total weight of the vehicle is a minimum total weight Wmin is represented by a one-dot chain line. A relationship between the vehicle speed and the driving force in a case where a depression amount is constant at the predetermined depression amount HR and a total weight of the vehicle is a maximum total weight Wmax is represented by a dotted line. The greater the total weight of the vehicle, the greater the driving force at the predetermined depression amount HR becomes. Therefore, the output control system S can drive the vehicle with an appropriate driving force corresponding to the total weight of the vehicle.

Further, a relationship between the vehicle speed and the driving force at the time when a depression amount is constant at the maximum depression amount HM is represented by a broken line. Regardless of a total weight of the vehicle, when the accelerator pedal 71 is depressed to the maximum depression amount HM, the output control system S can drive the vehicle with a driving force greater than a driving force at the predetermined depression amount HR.

It should be noted that, depending on the state of the motor 1 or a battery that supplies power thereto, the motor 1 cannot output the set-power when a depression amount is the predetermined depression amount HR. Accordingly, the output control system S notifies the driver that the motor 1 cannot output the set-power when a depression amount is the predetermined depression amount HR. For example, the motor control device 5 determines whether or not an abnormal state in which the motor 1 cannot output the set-power when a depression amount is the predetermined depression amount has occurred. Specifically, if temperatures of the motor 1 or the battery are equal to or higher than predetermined temperatures, the motor control device 5 determines that the motor 1 or the battery is in an abnormal state. Further, if the remaining battery capacity is equal to or less than a predetermined value, the motor control device 5 may determine that the battery is in an abnormal state.

If it is determined that an abnormal state, in which the motor 1 cannot output the set-power when a depression amount of the accelerator pedal 71 is the predetermined depression amount, has occurred, the output device 4 outputs warning information indicating the abnormal state. For example, the output device 4 turns on a lamp indicating the warning information. Further, the output device 4 may display an image indicating the abnormal state as the warning information. In this way, the output control system S can notify the driver driving the vehicle that the abnormal state has occurred.

[The Flow of Processing Executed by the Motor Control Device 5]

Figure 5:
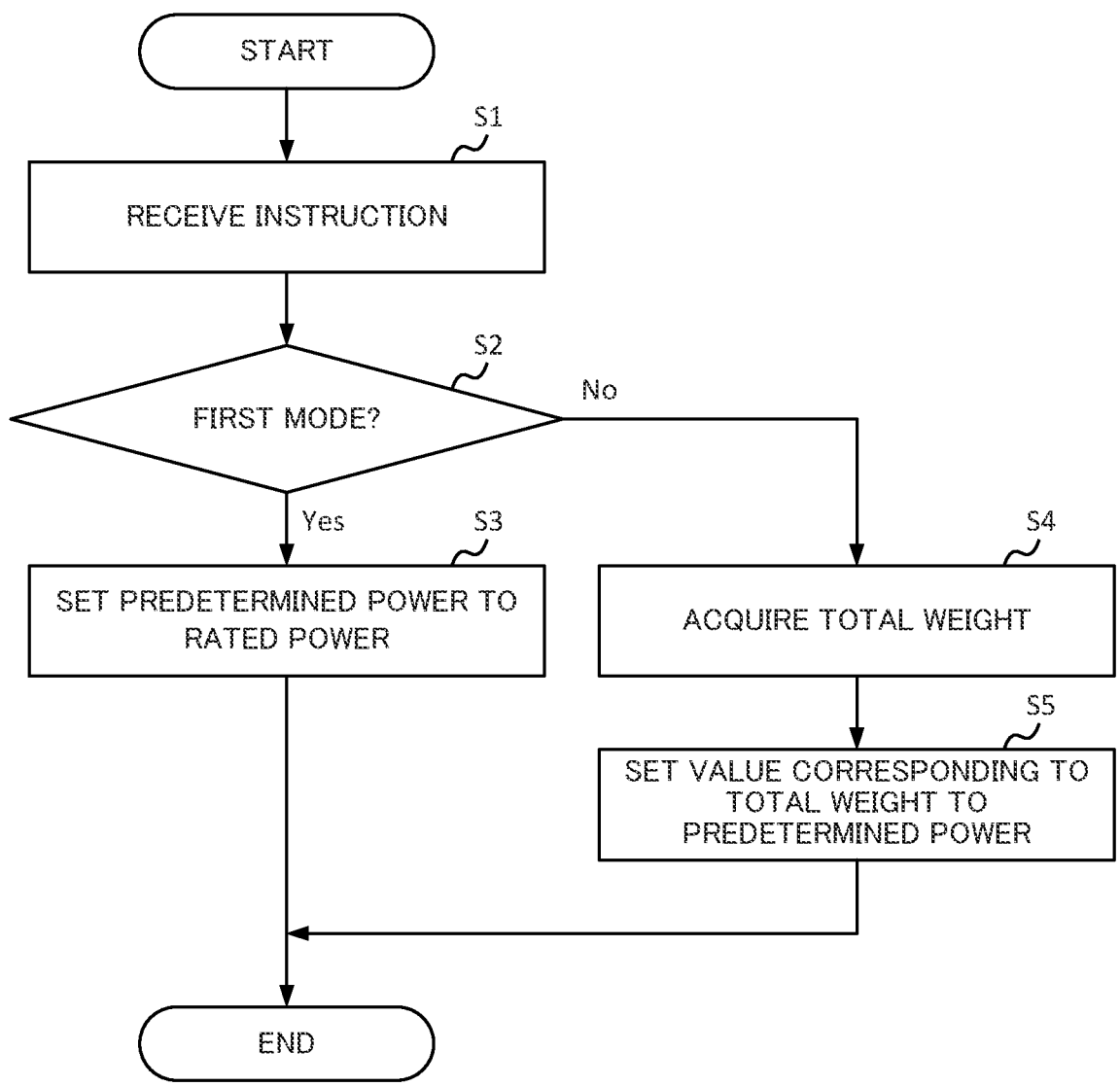
FIG. 5 is a flowchart showing an example of a flow of processing executed by a motor control device.

FIG. 5 is a flowchart showing an example of a flow of processing executed by the motor control device 5. First, the setting reception part 521 receives an instruction to set a mode input through the input device 2 (step S1). Specifically, the setting reception part 521 receives a setting instruction of the first mode or a setting instruction of the second mode input to the input device 2.

The output setting part 523 determines whether or not the received instruction is the setting instruction of the first mode (step S2). If the setting instruction of the first mode has been received ("Yes" in step S2), the output setting part 523 sets the set-power to the rated power (step S3).

If the setting instruction of the second mode has been received ("No" in step S3), the total weight acquiring part 522 acquires total weight information indicating a total weight of the vehicle (step S4). For example, the total weight acquitting part 522 acquires, as the total weight of the vehicle, a value obtained by adding together a weight of loaded goods estimated by the weight estimating part 3 and a weight of the subject vehicle stored in advance.

The output setting part 523 sets a value corresponding to the total weight to the set-power (step S5). For example, the output setting part 523 sets a value corresponding to the total weight as the set-power of the motor 1 by referencing a graph (see FIG. 2) showing a relationship between a total weight and a value corresponding to the total weight.

[Effect of the Output Control System S]

As described above, the detent mechanism 8 increases resistance acting on the accelerator pedal 71 at a position where a depression amount of the accelerator pedal 71 reaches the predetermined depression amount. Then, the motor control device 5 controls the output of the motor 1 such that the set-power is smaller than the maximum power of the motor 1 when a depression amount is the predetermined depression amount.

In this way, the resistance that the driver driving the vehicle feels from the accelerator pedal 71 can be increased when the driver depresses the accelerator pedal 71 to a position where the depression amount reaches the predetermined depression amount. Since increasing the depressing force is necessary in order to further depress the accelerator pedal 71 from a position where the depression amount reaches the predetermined depression amount, it is difficult for the driver to depress the accelerator pedal 71 from a position where the depression amount reaches the predetermined depression amount. As a result, a depression amount of the accelerator pedal 71 can be easily maintained at the predetermined depression amount.

Since the detent mechanism 8 makes it harder for the driver to depress the accelerator pedal 71 from a position where the depression amount reaches the predetermined depression amount, the motor control device 5 can prevent the motor 1 from outputting the maximum power. Further, since it becomes easier for the driver to maintain a depression amount of the accelerator pedal 71 at the predetermined depression amount, the motor control device 5 causes the motor 1 to maintain outputting the set-power that is smaller than the maximum power. Further, the motor 1 operating at the set-power prevents the heat generation within the motor 1, so that it is possible to prevent the output of the motor 1 from being limited. In this way, the output control system S can appropriately control the output of the motor 1 so that the motor 1 can operate at the maximum power when the motor needs to operate at the maximum power.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF REFERENCE NUMERALS

S output control system
1 motor
2 input device
3 weight estimating part
4 output device 5 motor control device
51 storage part
52 control part
521 setting reception part
522 total weight acquiring part
523 output setting part
524 depression amount acquiring part
525 motor control part
71 accelerator pedal
72 shaft
8 detent mechanism
9 depression amount sensor

What is claimed is:

1. An output control system comprising:
   an accelerator pedal;
   a motor for driving a vehicle by increasing an output as a depression amount of the accelerator pedal increases;
   a resistance applying mechanism that increases resistance acting on the accelerator pedal at a position where the depression amount of the accelerator pedal reaches a predetermined depression amount that is smaller than a maximum depression amount of the accelerator pedal;
   a depression amount acquiring part that acquires the depression amount of the accelerator pedal;
   a motor control part that controls the output of the motor such that the output of the motor becomes a predetermined power that is smaller than a maximum power of the motor when the depression amount acquired by the depression amount acquiring part is the predetermined depression amount;
   a total weight acquiring part that acquires total weight information indicating a total weight of the vehicle; and
   an output setting part that sets the predetermined power to a smaller value as the total weight indicated by the total weight information is smaller,
   wherein the motor control part controls the output of the motor such that the output of the motor becomes the predetermined power set by the output setting part when the depression amount is the predetermined depression amount.

2. The output control system according to claim 1, further comprising an output setting part that sets the predetermined power to a rated power of the motor that is smaller than the maximum power, wherein
   the motor control part controls the output of the motor such that the output of the motor becomes the rated power set as the predetermined power by the output setting part when the depression amount is the predetermined depression amount.

3. The output control system according to claim 1, further comprising:
   a setting reception part that receives a setting of a first mode for setting the predetermined power to a rated power of the motor that is smaller than the maximum power, or a second mode for setting the predetermined power to a smaller value as the total weight indicated by the total weight information is smaller;
   wherein the output setting part that sets the predetermined power to the rated power if the setting of the first mode is received, and sets the predetermined power to a smaller value as the total weight is smaller if the setting of the second mode is received.

4. The output control system according to claim 1, further comprising:
   an output device that outputs information indicating an abnormal state in which the motor 1 cannot output the predetermined power when the depression amount acquired by the depression amount acquiring part is the predetermined depression amount, if it is determined that the abnormal state has occurred.

5. The output control system according to claim 1, further comprising a shaft connected to the accelerator pedal and provided with a step at a position at which the depression amount reaches the predetermined depression amount,
   wherein the resistance applying mechanism includes a pin and a spring that is connected to the pin and applies a force to press the pin against the shaft in a direction perpendicular to a direction in which the accelerator pedal is depressed, and the resistance applying mechanism increases resistance acting on the accelerator pedal at a position where the depression amount reaches the predetermined depression amount by using an increase in resilience of the spring resulting from compression of the spring due to the pin and the spring being pressed by the step, when the accelerator pedal is depressed to a position where the depression amount reaches the predetermined depression amount.

6. An output control system comprising:
   an accelerator pedal;
   a motor for driving a vehicle by increasing an output as a depression amount of the accelerator pedal increases;
   a resistance applying mechanism that increases resistance acting on the accelerator pedal at a position where the depression amount of the accelerator pedal reaches a predetermined depression amount that is smaller than a maximum depression amount of the accelerator pedal;
   a depression amount acquiring part that acquires the depression amount of the accelerator pedal;
   a motor control part that controls the output of the motor such that the output of the motor becomes a predetermined power that is smaller than a maximum power of the motor when the depression amount acquired by the depression amount acquiring part is the predetermined depression amount;
   a total weight acquiring part that acquires total weight information indicating a total weight of the vehicle; and
   an output setting part that sets a value of the output of the motor corresponding to the predetermined depression amount when the total weight is a minimum total weight to a value that is smaller than a rated power, which is smaller than the maximum power of the motor, and sets a value of the output of the motor corresponding to the predetermined depression amount when the total weight is a maximum total weight to a value that is larger than the rated power,
   wherein the motor control part:
       controls the output of the motor such that an amount of the output of the motor becomes a value that is smaller than the rated power if the total weight is the minimum total weight, and if the depression amount is the predetermined depression mount;
       controls the output of the motor such that the amount of the output of the motor becomes a value greater than the rated power if the total weight is the maximum total weight, and if the depression amount is the predetermined depression amount;
       controls the output of the motor such that the output of the motor becomes the maximum power if the total weight is the minimum total weight, and if the depression amount is the maximum depression amount; and
       controls the output of the motor such that the output of the motor becomes the maximum power if the total weight is the maximum total weight, and if the depression amount is the maximum depression amount.

7. The output control system according to claim 6, wherein the motor control part causes an increase rate in the output of the motor until the predetermined depression amount reaches the maximum depression amount when the total weight is the minimum total weight to be larger than an increase rate in the output of the motor until the predetermined depression amount reaches the maximum depression amount when the total weight is the maximum total weight.

\* \* \* \* \*